United States Patent
Siebert et al.

(10) Patent No.: US 8,654,405 B2
(45) Date of Patent: Feb. 18, 2014

(54) METHOD FOR PRODUCING A MULTI-LAYERED FILM

(75) Inventors: Michael Siebert, Wedel (DE); Philipp Preuβ, Neuenhaus (DE)

(73) Assignee: tesa SE, Hamburg (DE)

(*) Notice: Subject to any disclaimer, the term of this patent is extended or adjusted under 35 U.S.C. 154(b) by 310 days.

(21) Appl. No.: 12/996,939

(22) PCT Filed: Aug. 28, 2009

(86) PCT No.: PCT/EP2009/061116
§ 371 (c)(1),
(2), (4) Date: Jan. 24, 2011

(87) PCT Pub. No.: WO2010/028960
PCT Pub. Date: Mar. 18, 2010

(65) Prior Publication Data
US 2011/0149349 A1  Jun. 23, 2011

(30) Foreign Application Priority Data

Sep. 9, 2008  (DE) .................... 10 2008 046 462

(51) Int. Cl.
*G06K 15/02* (2006.01)
*B41C 1/02* (2006.01)

(52) U.S. Cl.
USPC ............................................. 358/3.29

(58) Field of Classification Search
USPC .......... 358/3.29; 428/40.1, 29, 41.6; 156/237; 250/492.3; 283/81, 101, 86, 91
See application file for complete search history.

(56) References Cited

U.S. PATENT DOCUMENTS

| | | | |
|---|---|---|---|
| 6,443,494 B1 * | 9/2002 | Lieberman Zadjman et al. | 283/101 |
| 7,438,963 B2 * | 10/2008 | Koops et al. | 428/40.1 |
| 2004/0209086 A1 | 10/2004 | Koops et al. | |
| 2004/0247832 A1 | 12/2004 | Koops et al. | |
| 2010/0047488 A1 * | 2/2010 | Syrjanen et al. | 428/29 |

FOREIGN PATENT DOCUMENTS

| | | |
|---|---|---|
| DE | 100 48 665 A1 | 4/2002 |
| DE | 101 42 638 A1 | 5/2003 |
| DE | 10 2006 031189 A1 | 1/2008 |
| EP | 1 892 689 A1 | 2/2008 |
| JP | 2002 192634 A | 7/2002 |
| JP | 2005 501162 A | 1/2005 |
| JP | 2005 510765 A | 4/2005 |

* cited by examiner

*Primary Examiner* — Charlotte M Baker
(74) *Attorney, Agent, or Firm* — Norris McLaughlin & Marcus, P.A.

(57) ABSTRACT

A method for producing a multi-layered film wherein an engraving layer is partially printed onto a support film. Said engraving layer may be made of a UV-cured printing ink and a cover layer is applied to the entire surface above the partial engraving layer, optionally, directly to the partial engraving layer. The cover layer may be made of a UV-curable printing ink and may be printed over the engraving layer. A film produced by such method is also disclosed.

31 Claims, 2 Drawing Sheets

METHOD FOR PRODUCING A MULTI-LAYERED FILM

This application is a 371 of PCT/EP2009/061116, filed Aug. 28, 2009, which, in turn, claims priority of German Patent Application No. DE 10 2008 046 462.7, filed Sep. 9, 2008.

The present invention relates to a method for producing a film as described hereinbelow and to a multi-layered film as described hereinbelow.

For marking parts of vehicles, machines, electrical and electronic equipment, shipping containers etc., technical labels are being used increasingly, for example as identification plates, as control labels for process sequences, as safety labels or as guarantee and test badges.

For inscribing these plates or labels, powerful controllable lasers are widely used, for producing markings such as lettering, codes and the like. The material to be inscribed must meet high requirements. Thus, it should be possible for marking to take place rapidly, the resolution should be high, application should be simple and the material should have high resistance to mechanical, physical and chemical factors. The usual materials such as for example printed paper, anodized or painted aluminum or PVC films do not fulfill all of these requirements.

Furthermore, in some fields of application there is a desire for individualization of the labels, which should already be present before they are inscribed. Such individualization could for example contain a customer-specific design. Customer-specific individualization of this kind is usually achieved by simple printing of the label material. Such printing has the disadvantage that it can easily be imitated, e.g. by additional printing of a nonindividualized film. Furthermore, it is raised relative to the rest of the label material, with the result that it has low abrasion resistance.

A label is known from the prior art (DE 101 42 638 A1) that has customer-specific individualization, which is embedded in the label material, so that the abrasion resistance is increased and moreover counterfeiting of the material is more difficult. For production of this label, first an embossing layer is overprinted in strips in the form of a customer-specific, individualized pattern on a support film. The embossing layer is a UV-curable printing ink, which is cured by UV irradiation immediately after overprinting. Then an interlayer of a black-pigmented electron-beam-curable polyurethane-acrylate varnish is applied as engraving layer on the full area of the support film or the engraving layer strip. Then additionally, a so-called basis layer of an electron-beam-curable varnish is knife-coated on this acrylate varnish layer. Both acrylate varnish layers are then cured at the same time by irradiation with electrons. Next, the support film is stripped, i.e. removed from the varnish layers, and the multi-layered structure is left behind as laser-writable laser label material with a customer-specific individualized embossed identifier.

This film known from the prior art meets high requirements, yet still offers development potential for further possible applications.

The present invention is thus based on the problem of providing a method for producing a laser-writable film, which can be carried out simply and cost-effectively, and of providing a laser-writable film with versatile applications.

The present invention solves the aforementioned problem with a method with the features described hereinbelow and with a film as described hereinbelow.

The teaching of the invention is based firstly on the fundamental finding that it is possible to apply not only a single printing ink layer on a carrier material, but also several partial printing ink layers over one another, in each case independently of one another. After printing, the carrier can be stripped from the printing laminar structure in a stable process. The carrier on which the printing ink layers are applied is thus a support film, which can be removed again after the printing ink layers have been applied and cured. This is particularly advantageous when the film formed from the printing ink layers is designed to be self-supporting, i.e. an additional carrier is not provided. Alternatively or in addition, however, an additional permanent carrier can also be provided in the film structure.

This possibility was not recognized previously, as the application of several printing ink layers—especially of partial printing ink layers—requires precise matching of the printing process with respect to each printing ink layer, in order to ensure that the surface of the printing ink layer system on the carrier side is completely smooth and the anchoring of this surface with the carrier is well-defined, so that the carrier can always be removed from the printing ink layer without tearing of the film.

Relative to other varnish layers as well as laminate layers, the printing ink layers offer the advantage that they can be applied relatively thinly. This leads to the possibility of quicker laser labeling, because a thinner layer can be inscribed faster owing to the smaller mass removal during the laser labeling. In particular, printing ink layers are applied namely with a layer thickness from about 1 μm to about 5 μm, whereas the layer thickness of ESH-acrylate varnish layers is usually at least 8 μm.

To summarize, it was recognized that it is possible, even though at first the expense seems disproportionate, to embed a logo not only in an electron-beam-curable varnish, but also in a UV-curable printing ink. It was found that with a suitable, layer-dependent adjustment of the screen rolls, of the printing speed, of the UV dose and of the printing ink used, a stable process of ink application can also be achieved by means of printing technology. In particular, in this way the film can contain color markings on its surface, which have a very high resistance and can be incorporated exclusively during manufacture of the film composite and therefore offer a very high level of protection against counterfeiting.

According to the invention, in the method for producing a multi-layered film, an engraving layer is partially overprinted. The engraving layer is, in particular, a layer in which a marking can be incorporated by means of laser irradiation, for example by local removal of the engraving layer, a local change in optical properties (for example reflection, transmission, color) or similar. However, any other layers based on printing ink are also designated as engraving layer.

The partial engraving layer is overprinted on a support film, which is stripped away again after production of the laser-writable film. The partial engraving layer is formed from a UV-curable printing ink. The partial overprinting takes place in particular in the form of a customer-specific selected pattern, for example in the form of a logo or the like.

A cover layer is then applied on top of the partial engraving layer, said cover layer being formed in its turn from a UV-curable printing ink, and is overprinted. Printing ink means any printing ink, regardless of whether it is transparent or colored. What is important is that it is applied by printing technology, preferably by the flexographic process.

In particular, this cover layer is applied on the full area, so that it completely covers the partial engraving layer and the carrier underneath it. If no additional interlayer is provided between the engraving layer and the cover layer, the partial engraving layer is therefore completely embedded in the cover layer. If a full-area interlayer is provided between the cover layer and the partial engraving layer, the engraving layer is embedded in this full-area interlayer. In particular, said full-area interlayer can be a metallic-luster layer, i.e. a layer that has a metallic luster. In particular, metallic-luster pigments are incorporated in said layer, as is described in the applicant's parallel patent application. Consideration may be given in particular to aluminum powder, bronze powder, nacreous pigments, gold powder, silver powder and/or copper powder as metallic-luster pigments.

In a preferred embodiment, the laser-writable film is formed with a carrier. For this, for example a film can be laminated onto the cover layer, or a full-area carrier layer of an electron-beam-curable acrylate varnish can be applied on the cover layer.

Possible fluctuations in layer thickness of the printing ink composite, such as arise for example through overprinting of a partial engraving layer, only occur on the side opposite to the supporting carrier. Due to the system and production, after stripping of the process liner there is always, on the exposed side, a very smooth surface without steps or edges between different engraving layers, so that a very high surface resistance can be achieved. At the same time, the stripping process ensures that said layer structure, in combination with said surface finish, cannot be obtained by later manipulation of a film.

The fluctuations in layer thickness occurring on the opposite side can be compensated e.g. by subsequent knife coating with an acrylate varnish or a sufficiently thick adhesive substance.

Moreover, it can be envisaged that an inverse engraving layer is partially overprinted substantially with accurate register with a pattern inverse to the engraving layer, which is also formed from UV-curable printing ink. The two UV-curable printing inks are then in particular colored differently to one another, but also with a different color to the cover layer, to permit the greatest possible color contrast. Conversely, a same-color embodiment of the two printing inks is preferred if additional pigments, e.g. UV fluorescence pigments, are incorporated in one of the varnishes. The difference in structure is then only visible in certain conditions, so that hidden marking can be achieved.

With respect to the engraving layer and/or the inverse engraving layer, it can be envisaged that this is formed from several layers of UV-curable printing inks. This is in particular of advantage when the pattern is to be multicolored, or multicolored inscription is to be used.

The partial engraving layer and the inverse engraving layer or, in the case of a multi-layered embodiment, the corresponding layer sequences are, in a preferred embodiment, applied with a substantially corresponding layer thickness. In this case the full-area cover layer then also has an essentially constant layer thickness. This is advantageous in particular with respect to simple laser labeling, because when inscribing the cover layer there is therefore no need for adjustment of the laser parameters to different layer thicknesses. Moreover, this means that the surface on the side opposite to the process liner has no curvature or steps.

Furthermore, it can be envisaged that further printing ink layers are applied above the cover layer, and are in particular formed from differently colored UV-curable printing inks. This is advantageous in particular with respect to the possibility of multicolored labeling. These further printing ink layers are preferably formed with full area. In a further preferred embodiment the whole area of the support film is first printed with a printing ink layer that is in particular transparent. The partial engraving layer is then overprinted on the printing ink layer and the full-area cover layer is applied on top of that.

In a preferred embodiment the printing ink layers are in each case arranged directly above one another, i.e. no further interlayers are provided. This is advantageous in particular with respect to the thinnest possible and least expensive formation of the film.

In another preferred embodiment the engraving layer and/or an inverse engraving layer are provided with another security element. Said security element can be for example UV-fluorescing pigments, which are incorporated in the printing ink. The printing ink itself is in this case formulated in particular so that it is transparent.

The printing ink of the cover layer and/or the printing ink of the printing ink layers in particular have admixtures of laser absorbers, to provide good labeling by means of laser radiation. In particular, titanium dioxide and/or carbon black are incorporated as laser absorbers. Both additives are good laser absorbers. Moreover, these two additives are characterized by good compatibility with the other constituents of printing inks. By adding titanium dioxide and/or carbon black as laser absorbers it is moreover possible to use a printing ink of any color. With respect to laser absorption, the actual coloring pigment of the printing ink no longer needs to fulfill any special absorption properties. In particular, therefore, a laser-writable printing ink layer can be formed as a yellow printing ink layer. In the past this was not possible with other systems, or only at great expense.

A proportion of at least 5%, preferably of at least 10%, has proved to be especially advantageous for the additive titanium dioxide. With respect to carbon black, proportions of at least 2%, preferably of at least 4%, have proved optimal.

A printing ink layer is therefore preferably also an engraving layer, i.e. in addition marking can be incorporated in the printing ink layer by means of laser irradiation, e.g. by local removal of the engraving layer, a local change in optical properties (for example reflection, transmission, color) or similar. However, a printing ink layer can also be formed without laser absorbers, for example as a transparent layer. In this case, however, a printing ink layer should be formed underneath as an engraving layer, to make laser labeling possible.

In order to achieve on the one hand a sufficient color contrast and on the other hand the maximum possible labeling efficiency, in particular the partial engraving layer, but preferably also the further printing ink layers, should have a layer thickness between about 0.5 µm and about 10 µm, preferably between about 1 µm and about 5 µm. If no inverse engraving layer is provided, that immediately above the partial engraving layer should of course be formed with a thickness such that it completely covers the partial engraving layer.

Furthermore, in a preferred embodiment it is envisaged that each printing ink layer is cured before printing with the next printing ink layer. This can ensure that intermixing of the individual printing ink layers and therefore intermixing of the respective colors is avoided. Curing of the individual printing ink layers is effected in particular by UV irradiation.

The layer thickness of the carrier is preferably between about 50 µm and about 200 µm. As carriers, basically all films and film composite systems may be considered. In particular, for example polymer films such as polyethylene film, PVC film or the like are suitable. With respect to the carrier, it is only necessary to ensure that there is good adhesion between it and the printing ink layer. Optionally, this can be achieved by applying an additional adhesion promoter, as is known from the prior art.

In an especially preferred embodiment, the laser-writable film is formed as an adhesive film, in particular as a self-adhesive film, by applying a layer of adhesive. The layer of adhesive can be based on any adhesive substances, such as are known from the prior art, in particular so-called contact adhesives or heat-activated adhesives. If the laser-writable film has a permanent carrier, then for reasons of simple production the layer of adhesive is preferably applied on the side of the carrier opposite to the printing ink layers. Alternatively, however, the layer of adhesive can also be applied on the topmost varnish layer. In this case, however, the carrier should be transparent, so that the labeling is legible through the carrier. This arrangement has the advantage that the film cannot be detached after gluing without fracturing the varnish layers and therefore an identifier incorporated there. The printing ink layers can in fact be made to be very friable and therefore without the aid of a carrier cannot be detached without damage after they have been glued. However, as the carrier is arranged above the varnish layers, the printing ink layers are damaged if there is any attempt at tampering.

BRIEF DESCRIPTION OF THE DRAWINGS

Further details, aims, features and advantages of the present invention are explained below with an example. In the drawing

FIGS. 1 and 4 show how a laser-writable film 1 according to a first example is produced. In this case a polyester film with a thickness of 50 μm is used as the support film 2. The support film 2 is overprinted with a UV-curable printing ink partially in the form of a pattern or the like, namely repeated here in the form of a logo "tesa", by a flexographic process. The printing ink is then cured by UV irradiation and forms the partial engraving layer 3.

Figure 1:
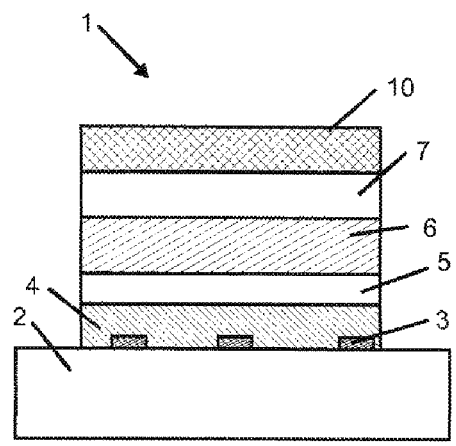
FIG. 1 shows a schematic longitudinal section through a laser-writable film produced according to a first embodiment of the method according to the invention.

The partial engraving layer 3 and the regions of the support film 2 that are still free are then overprinted in full area with another UV-curable printing ink, so that a cover layer 4 is formed. This layer is also cured by UV irradiation. This is preferably followed by another, in particular full-area, printing ink layer 5 of a UV-curable printing ink, and this is also cured.

Next, a carrier 6 is applied on the printing ink layer 5. In the present case it is an ESH-curable acrylate varnish with a layer thickness of about 80 μm. Alternatively, other carriers can also be used, for example polymer films, based on polyethylene, polyvinyl chloride, polypropylene etc. In the present case the carrier 6 is arranged in the end product on the underside (apart from a layer of adhesive 7) and is in this case white.

A layer of adhesive 7 is then applied on the carrier 6; this is preferably a layer of adhesive 7 based on a contact adhesive, which is thus already adhesive at room temperature. In the present case the layer of adhesive has a layer thickness of about 30 μm.

The layer of adhesive 7 is in this case also covered with a separating layer 10, which is usually removed just before application of film 1 on an object. The separating layer 10 serves to protect the layer of adhesive 7 prior to application. Basically all flat products with low adhesion, for example siliconized papers or the like, are suitable as the separating layer 10.

The printing ink layers 3, 4, 5 are in each case formed as engraving layers, i.e. as layers that can be altered locally, in particular can be removed locally, by means of laser irradiation. For this purpose, the printing ink layers each have laser absorbers, to provide maximum possible sensitivity to laser irradiation and thus make rapid labeling possible. In the present case the printing inks have both titanium dioxide and carbon black incorporated as laser absorbers, as this combination has proved particularly advantageous. The proportion of titanium dioxide is then preferably at least 5%, more preferably at least about 10%. The proportion of carbon black is preferably at least about 2%, more preferably at least about 4%. The respective proportions in the printing ink layers can differ from one another; they are established depending on the other constituents of the printing ink layers (coloring pigments, binder etc.), the proposed layer thickness etc., to make labeling as efficient as possible.

The layer thickness of the partial engraving layer 3 is preferably in the range between about 0.5 μm and about 5 μm. In the present case it is about 1 μm. In contrast, the layer thickness of the cover layer 4 should be sufficient for the partial engraving layer 3 to be embedded in it. Its maximum layer thickness should basically be between about 1 μm and about 10 μm. In the present case the layer thickness above the partial engraving layer is about 2 μm and on the support film 2 about 3 μm. The layer thickness of the printing ink layer 5 once again is preferably in the range between about 1 μm and about 5 μm. In the present case it is about 4 μm.

The partial engraving layer 3 and the cover layer 4 should be formed with different colors, so that the pattern, here in the form of the logo "tesa", shows through clearly. In the laser-writable film 1 shown in FIG. 1 the partial engraving layer 3 is formed in black, i.e. the printing ink contains black colored pigments. In contrast, the cover layer 4 is formed red, and the printing ink contains red colored pigments, so that this produces a clear contrast to the partial engraving layer 3. The printing ink layer 5 in its turn contains yellow colored pigments and forms a yellow layer, with which the white carrier 6 once again forms a good contrast. Depending on what is required, laser labeling, in the present case by local removal of the respective layer or layers by laser irradiation, can produce multicolored labeling.

Labels are then cut or punched from the film 1, and can then—before or after laser labeling—be glued on the object that is to be marked. Preferably the laser labels are cut by laser, in particular by means of the same laser that is also used for the laser labeling.

Cutting and inscribing can then be effected in a joint operation. In particular there can then also be correlation of the form of the label with the contents of the inscription. Information can for example be provided by one or more notches on the label edge with the same and/or different width like a barcode or similar in the form of the label. In addition, information is provided by the labeling. These two pieces of information can be correlated so that information is repeated partially or completely, and optionally coded. Alternatively, the correlation can also be such that the two pieces of information combine to form the complete information.

Figure 2:
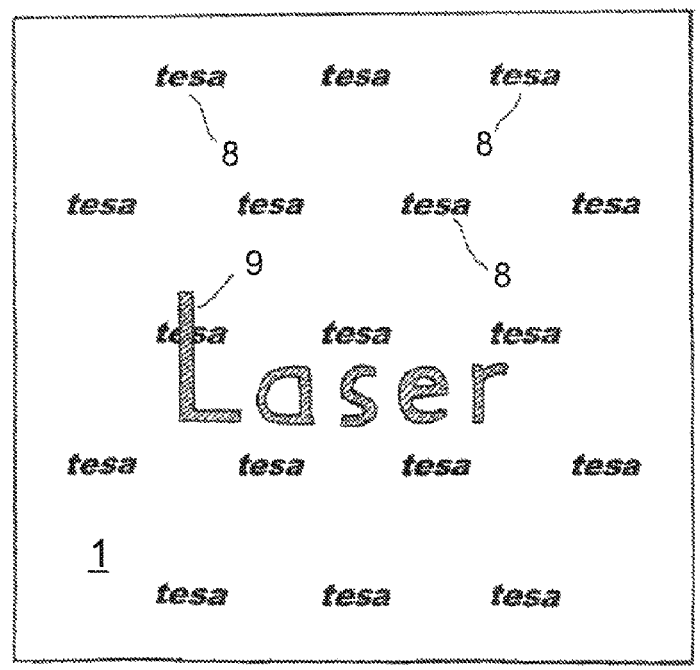
FIG. 2 shows a top view of an inscribed label according to the embodiment from FIG. 1.

FIG. 2 shows a top view of a label 1 that was cut out of the film described previously and has already been inscribed. The pattern 8 in the form of the logo "tesa" formed by the partial engraving layer 3 can be seen clearly. An inscription 9 in the form of the logo "Laser" can also be seen, shown here only in black and white. This inscription can be of one color or multicolored, depending on how the laser labeling was carried out, and in particular can show the colors yellow and white, or partially underneath the engraving layer 3, red. It is also clear from this representation that the partial engraving layer 3 is not disturbed by the labeling, this can in fact take place through the partial engraving layer 3.

Figure 3:
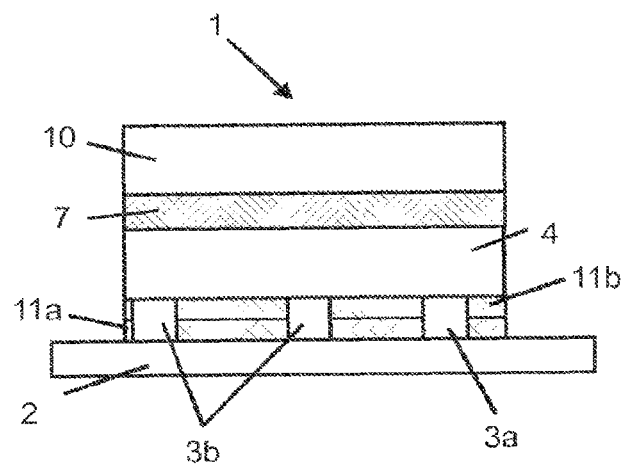
FIG. 3 shows a schematic longitudinal section through an alternative embodiment of a laser-writable film.
Figure 4:
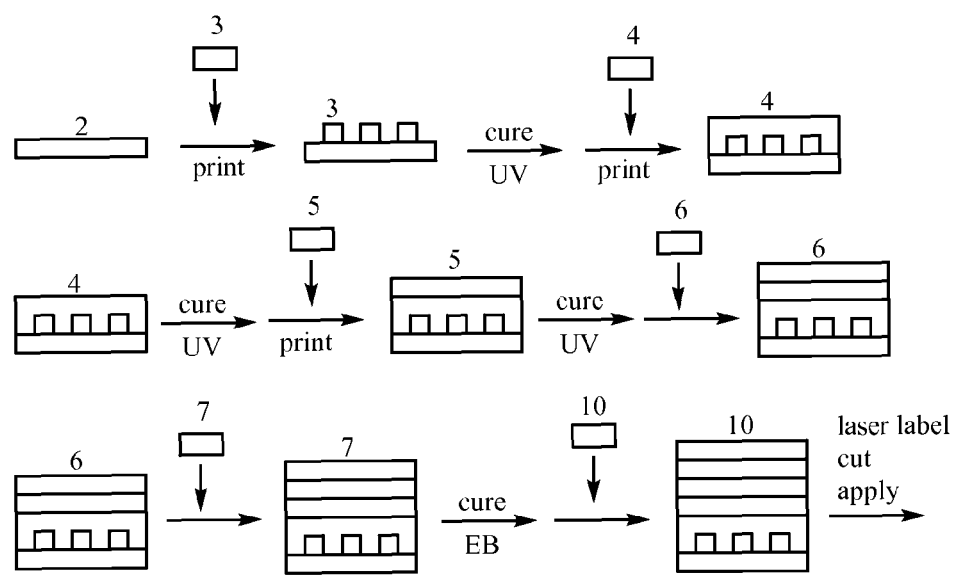
FIG. 4 shows a schematic of a method of making one embodiment of the multi-layered film according to the present invention.

FIG. 3 shows a schematic longitudinal section of an alternative embodiment of a laser-writable film 1. In this case the arrangement on the support film 2 is shown.

The partial engraving layer 3, which is applied here on the carrier 2, is provided in various colors here, namely by a first partial engraving layer 3a, which is formed by a yellow printing ink, and a second partial engraving layer 3b, which is formed by a red printing ink. Therefore the pattern formed by the engraving layer 3 is already multicolored, namely two-colored in this case.

Then, an inverse engraving layer 11 is provided in the interstices of the partial engraving layer 3. The inverse engraving layer 11 is formed from two differently colored UV-curable printing inks applied on top of one another, namely a black printing ink layer 11a and a white printing ink layer 11b. The engraving layer 3 and the inverse engraving layer 11 have roughly the same layer thickness, in the present case namely about 5 μm.

In the present case, a full-area cover layer 4 of a UV-curable printing ink is also provided above the engraving layer 3 and the inverse engraving layer 11. This cover layer is green, thus making another color effect possible in laser labeling.

The cover layer 4 is then followed by a layer of adhesive 7 and a separating layer 10.

The invention claimed is:

1. A method for producing a multi-layered film, comprising partially overprinting an engraving layer on a support film to form a partial engraving layer on said support film, the partial engraving layer being formed from a UV-curable printing ink, and overprinting a cover layer on the whole area above the partial engraving layer, wherein the cover layer is formed from a UV-curable printing ink.

2. The method as claimed in claim 1, wherein the overprinting comprises a flexographic printing process.

3. The method as claimed in claim 1, which further comprises applying a carrier above the cover layer.

4. The method as claimed in claim 1, which further comprises partially overprinting an inverse engraving layer essentially with accurate register with a pattern inverse to the engraving layer, the inverse engraving layer being formed from a UV-curable printing ink.

5. The method as claimed in claim 4, which further comprises overprinting the engraving layer and the inverse engraving layer with an essentially coinciding layer thickness.

6. The method as claimed in claim 1, which further comprises forming the engraving layer and/or the inverse engraving layer from several layers of UV-curable printing inks.

7. The method as claimed in claim 1, which further comprises overprinting one or more further printing ink layers above the cover layer, these printing ink layers being formed from a UV-curable printing ink.

8. The method as claimed in claim 7, wherein the further printing ink layers are formed full-area or partially.

9. The method as claimed in claim 1, which further comprises printing the support film full-area with a printing ink layer and overprinting the partial engraving layer on this printing ink layer.

10. The method as claimed in claim 1, which further comprises printing the support film or a printing ink layer with a metallic-luster layer and overprinting the engraving layer on the metallic-luster layer.

11. The method as claimed in claim 1, which further comprises overprinting one or more printing ink layers with a thickness between about 0.5 μm and about 10 μm.

12. The method as claimed in claim 1, which further comprises overprinting the partial engraving layer with a thickness between about 0.5 μm and about 5 μm.

13. The method as claimed in claim 1, which further comprises providing the partial engraving layer and/or an inverse engraving layer with a security element.

14. The method as claimed in claim 1, which further comprises incorporating laser absorbers in the printing ink of the cover layer and/or in the printing ink of the engraving layer.

15. The method as claimed in claim 1, which further comprises overprinting the cover layer with a thickness between about 1 μm and about 10 μm.

16. The method as claimed in claim 1, which further comprises forming the carrier layer with a thickness between about 50 μm and about 200 μm.

17. A multi-layered film, comprising a printed partial engraving layer of a UV-curable printing ink and a printed cover layer arranged full-area above the engraving layer, wherein the cover layer is formed from a UV-curable printing ink.

18. The film as claimed in claim 17, wherein the cover layer is arranged directly on the engraving layer.

19. The film as claimed in claim 17, wherein a printed metallic-luster layer is arranged between the engraving layer and the cover layer.

20. The film as claimed in claim 17, wherein a full-area carrier layer is arranged above the cover layer.

21. The film as claimed in claim 20, wherein the carrier layer has a layer thickness between about 50 μm and about 200 μm and/or wherein the cover layer has a layer thickness between about 1 μm and about 10 μm.

22. The film as claimed in claim 17, wherein the engraving layer and/or the inverse engraving layer are formed from several layers of UV-curable printing inks.

23. The film as claimed in claim 17, wherein the engraving layer and the inverse engraving layer have an essentially equal layer thickness.

24. The film as claimed in claim 17, wherein one or more further printing ink layers are arranged above the cover layer, the printing ink layers being formed in each case from a UV-curable printing ink.

25. The film as claimed in claim 17, wherein a printed printing ink layer and/or a printed metallic-luster layer are arranged under the engraving layer.

26. The film as claimed in claim 17, wherein one or more printed printing ink layers have a layer thickness between about 0.5 μm and about 10 μm and/or wherein the engraving layer has a layer thickness between about 0.5 μm and about 5 μm.

27. The film as claimed in claim 17, wherein an inverse engraving layer is arranged partially essentially with accurate register with a pattern inverse to the engraving layer in gaps in the engraving layer and in that the inverse engraving layer is formed from a UV-curable printing ink.

28. The film as claimed in claim 17, wherein the engraving layer and/or an inverse engraving layer have a security element.

29. The film as claimed in claim 17, wherein the printing ink of the cover layer and/or the printing ink of the engraving layer contain laser absorbers.

30. A method for producing a multi-layered film, comprising partially overprinting an engraving layer on a support film to form a partial engraving layer on said support film, the engraving layer being formed from a UV-curable printing ink, and overprinting a cover layer on the whole area above the partial engraving layer, wherein the cover layer is formed as a metallic-luster layer, and overprinting another engraving layer on the metallic-luster layer.

31. The method as claimed in claim 30, wherein the overprinting comprises a flexographic printing process.

* * * * *